United States Patent [19]

Jorge et al.

[11] Patent Number: 5,073,617

[45] Date of Patent: Dec. 17, 1991

[54] BARRIER FILM AND PROCESS FOR MAKING

[75] Inventors: Edward M. Jorge, Midland, Mich.; Antonio Torres, Simtsonville, S.C.; Monty M. Lund, deceased, late of Midland, Mich., by Lorraine K. Lund, administrator

[73] Assignee: The Dow Chemical Company, Midland, Mich.

[21] Appl. No.: 292,716

[22] Filed: Jan. 3, 1989

[51] Int. Cl.$^5$ .................. C08F 14/08; C08F 114/08; C08F 214/08

[52] U.S. Cl. .................. 526/343; 525/330.7; 525/331.4; 525/331.5; 264/564; 264/566; 264/569; 425/7; 425/72.1

[58] Field of Search .................. 526/343; 525/330.7, 525/331.4, 331.5

[56] References Cited

U.S. PATENT DOCUMENTS 4,000,359  12/1976  Watts .................. 526/328

Primary Examiner—Joseph L. Schofer
Assistant Examiner—Fred Zitomer
Attorney, Agent, or Firm—Thomas Daniel Zindrick; Lisha Simmonds Zindrick

[57] ABSTRACT

The present invention is directed toward a film comprising a vinylidene chloride interpolymer, wherein the vinylidene chloride interpolymer having polymerized herein vinylidene chloride in an amount of from about 75 to about 95 percent by weight of interpolymer and from about 25 to about 5 percent by weight of interpolymer of at least one monomer copolymerized therewith, is prepared by extruding said interpolymer through an extrusion die to form an extrudate; passing the extrudate through a cooling means; blowing a blown tubular bubble by expanding the cooled extrudate sheet around a trapped gaseous medium, said bubble having an effective blow-up ratio before deflation such that the bubble after deflation has a desired final blow-up ratio; and conveying the tubular bubble through a deflator means to collapse the bubble into a two-layer film, wherein the film has a final blow-up ratio of between about 2.5 to about 3.5 said film having an amorphous phase and a crystalline phase with vinylidene chloride crystalline units, said crystalline units and amorphous units being positioned such that the film has a machine direction Elmendorf tear strength of at least 1.5 times the transverse direction percent elongation of at least 1.5 times machine direction percent elongation. The film and the process of making the film of the present invention is thought to improve handling of consumer films.

10 Claims, 1 Drawing Sheet

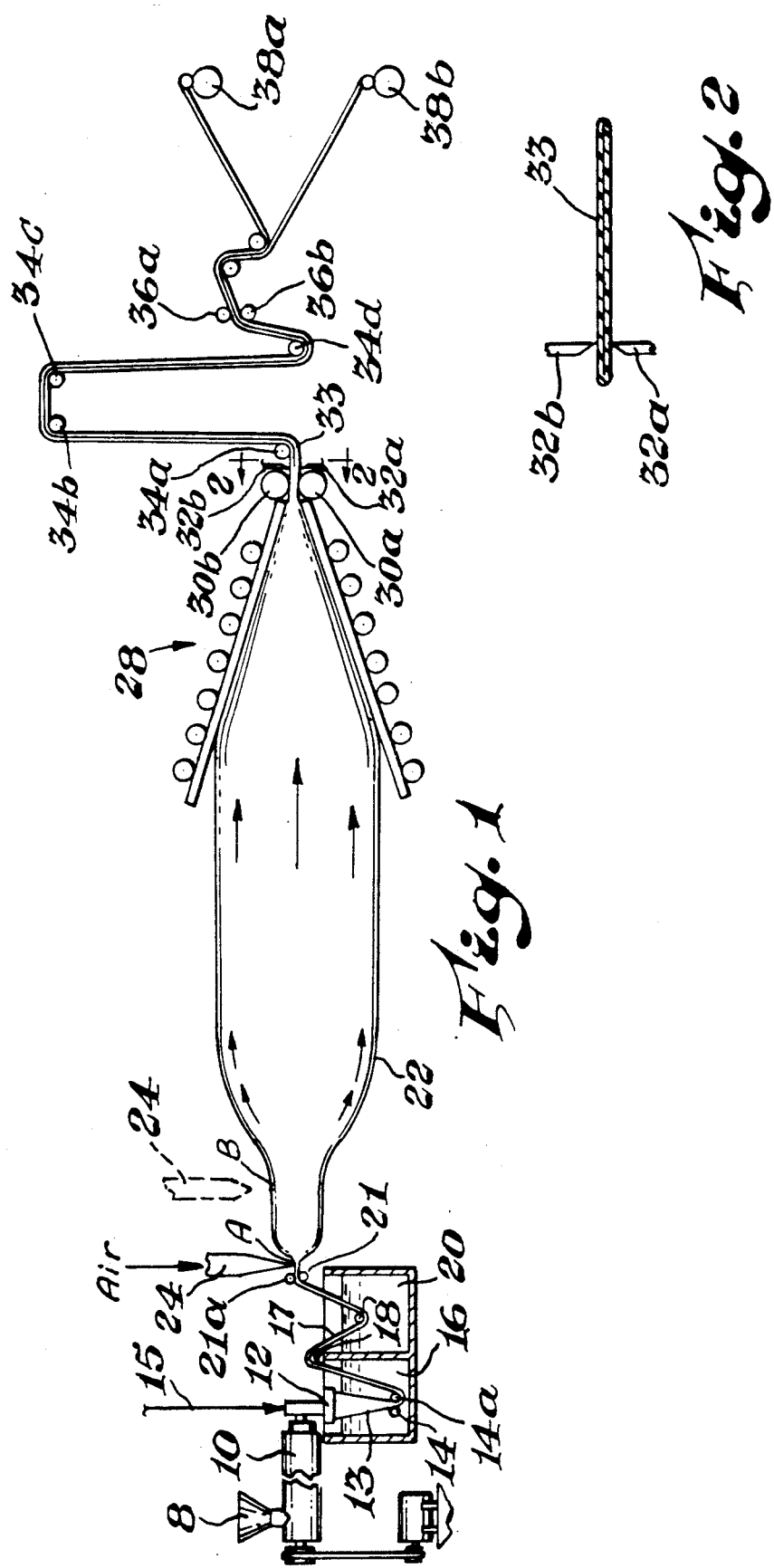

BARRIER FILM AND PROCESS FOR MAKING

FIELD OF THE INVENTION

This invention relates to polymeric packaging film, more particularly to consumer wraps made of vinylidene chloride interpolymers.

BACKGROUND OF THE INVENTION

Vinylidene chloride interpolymers are well-known in the prior art for their excellent barrier to the mass transport of atmospheric gases and moisture vapor. Because of their excellent barrier properties, vinylidene chloride interpolymers are well suited for use in food packaging operations and other similar operations, wherein it is desirable to protect a given article from oxygen and loss of moisture.

While conventionally made films of vinylidene chloride perform adequately, these films have not been completely satisfactory in use. For example, consumers are interested in the ease of dispensing and tearing off a sheet of film as it is withdrawn from the container in which the film is packaged. Manufacturers have attempted to comply with this consumer demand by supplying containers, such as cartons, which are ordinarily provided with sharp edges, usually a saw-toothed edge known as a cutter bar. The films can then be withdrawn from the container to a desired length and severed along the cutter bar with ease.

Generally, films of vinylidene chloride interpolymers have inadequate strength in the machine direction, which causes the films to tear in strips during dispensing and handling. This tearing is problematic for consumer films, due to the notch sensitive nature of the film. Thus, it may be difficult to restart proper dispensing of the film.

Accordingly, it is an object of this invention to provide a film of vinylidene chloride which has good barrier to atmospheric gases and good handling properties, such as high strength characteristics and easy cutter bar tear.

It is another object of this invention to provide a process for the production of films of vinylidene chloride having good barrier to atmospheric gases and good handling properties, such as high strength characteristics and easy cutter bar tear.

SUMMARY OF THE INVENTION

In one embodiment, the present invention is a film comprising a vinylidene chloride interpolymer, the vinylidene chloride interpolymer having polymerized therein vinylidene chloride in an amount of from about 75 to about 95 percent by weight of interpolymer and from about 25 to about 5 percent by weight of interpolymer polymer of at least one monomer copolymerized therewith, said film having an amorphous phase and a crystalline phase with vinylidene chloride crystalline units, said crystalline units and amorphous units being positioned such that the film has a machine direction Elmendorf tear strength of at least 1.5 times the transverse direction Elmendorf tear strength, or a transverse direction percent elongation of at least 1.5 times machine direction percent elongation.

The present invention also comprehends a method for the production of a film, the steps of the method comprising (a) providing a resin which comprises a vinylidene chloride interpolymer, the vinylidene chloride interpolymer having polymerized therein vinylidene chloride in an amount of from about 75 to about 95 percent by weight of interpolymer and from about 25 to about 5 percent by weight of interpolymer of at least one monomer copolymerized therewith; (b) extruding said resin through an extrusion die to form an extrudate: (c) passing the extrudate through a cooling means: (d) blowing a blown tubular bubble by expanding the cooled extrudate around a trapped gaseous medium, said bubble having an effective blow-up ratio before deflation such that the bubble after deflation has a desired final blow-up ratio; and (e) conveying the tubular bubble through a deflator means to collapse the bubble into a two-layer film, wherein the film has a final blow-up ratio of between about 2.5 to about 3.5.

The present invention also comprehends a method for the production of a film, the steps of the method comprising (a) providing a resin which comprises a vinylidene chloride interpolymer, the vinylidene chloride interpolymer having polymerized therein vinylidene chloride in an amount of from about 75 to about 95 percent by weight of interpolymer and from about 25 to about 5 percent by weight of interpolymer of at least one monomer copolymerized therewith: (b) extruding said resin through an extrusion die to form an extrudate: (c) passing the extrudate through a cooling means: (d) blowing a blown tubular bubble by expanding the cooled extrudate sheet around a trapped gaseous medium, said bubble having an effective blow-up ratio before deflation such that the bubble after deflation has a desired final blow-up ratio: (e) conveying the tubular bubble through a deflator means to collapse the bubble into a two-layer film; and (f) pulling the film through a pair of tension nip rolls, said nip rolls being set to apply a tension on the film of between about 500 and about 5000 psi, wherein the film has a final blow-up ratio of between about 2.5 and 3.5.

DESCRIPTION OF THE DRAWING

FIG. 1 is a side elevation, partially in section view.

FIG. 2 is an enlarged fragmentary, sectional view taken along the line 2—2 in FIG. 1.

DETAILED DESCRIPTION OF THE INVENTION

For the purposes of this invention, a film is defined as having a thickness of 2 $\mu$m (0.1 mil) to 250 $\mu$m (10 mils). To achieve maximum desired orientation effects, described below in greater detail, the film preferably has a thickness of from about 7 $\mu$m (0.3 mil) to about to 25 $\mu$m (1 mil).

Such films can typically be single-layered or multi-layered. Typically, if the film is multi-layered, it has at least one outside, or skin, layer, a barrier layer, and an adhesive, or tie, layer interposed between each skin layer and the barrier layer. Thus, in a film having one outer layer and one inner layer, there will be one tie layer therebetween. In a film three layers, there will be two tie layers provided. Generally, in multi-layered films the inner and outer layers are coextruded with the tie layer therebetween.

The films of the present invention are fabricated from a crystallizable interpolymer comprising vinylidene chloride and suitable copolymers and additives. The body of the plastic articles comprise multilayers of different thermoplastic resins. The layers provide adequate strength and barrier properties, permitting packaging of food which needs excellent protection from oxygen and/or water vapor permeation into or out of the article.

The barrier layer can comprise a material having high oxygen barrier properties. The primary requirements for the barrier layer are that the material be extrudable within a sheath of another polymer and that the composition have the desired gas and moisture vapor transmission barrier characteristics. Vinylidene chloride interpolymers are preferably employed as the barrier layer.

For the purposes of this invention, it is understood that the term "vinylidene chloride interpolymer" encompasses both homopolymers, and interpolymers of vinylidene chloride monomer. The vinylidene chloride interpolymer comprises vinylidene chloride copolymerized with another monoethylenically unsaturated monomer.

Monoethylenically unsaturated comonomers suitable for copolymerization with vinylidene chloride include vinyl chloride, alkyl acrylates, alkyl methacrylates, acrylic acid, methacrylic acid, itaconic acid, acrylonitrile, and methacrylonitrile. The monoethylenically unsaturated comonomers are desirably selected from the group consisting of vinyl chloride, alkyl acrylates, and alkyl methacrylates, the alkyl acrylates and alkyl methacrylates having from about 1 to about 8 carbon atoms per alkyl group. The alkyl acrylates and alkyl methacrylates preferably have from about 1 to about 4 carbon atoms per alkyl group. The alkyl acrylates and alkyl methacrylates are most preferably selected from the group consisting of methylacrylate, ethylacrylate, and methyl methacrylate.

The monomer mixture comprises a vinylidene chloride monomer generally in the range of from about 60 to about 99 weight percent and the monoethylenically unsaturated comonomer in an amount of from about 40 to about 1 weight percent, said weight percents being based on total weight of the vinylidene chloride interpolymer. The preferred ranges are dependent upon the monoethylenically unsaturated comonomer copolymerized therewith, each are well-known to one skilled in the art.

Methods of forming the vinylidene chloride interpolymers suitable for use in the present invention are well-known in the prior art. The vinylidene chloride interpolymer is generally formed through an emulsion or suspension polymerization process. Exemplary of such processes are U.S. Pat. Nos. 2,558,728; 3,007,903; 3,642,743: and 3,879,359; and the methods described by R. A. Wessling, in Polyvinylidene Chloride, Gordon and Breach Science Publishers, New York, 1977, Chapter 3; all of which are incorporated herein by reference.

Beneficially, in the extrusion of the vinylidene chloride interpolymers, it is frequently advantageous and beneficial to incorporate additives well-known to those skilled in the art. Exemplary of additives which may be incorporated in the package are light stabilizers such as hindered phenol derivatives: pigments such as titanium dioxide and the like, plasticizers, lubricants, extrusion aids and the like. Each of these additives is known and several types of each are commercially available. The additives may be incorporated by methods such as conventional melt blending and dry blending techniques.

Each barrier layer may vary in thickness, depending upon the particle application in which the article is to be used. The barrier layer thickness is generally from about 10 percent to about 40 percent of the total thickness of the multilayer structure. In relatively rigid articles, the barrier layer thickness will be from between about 1.5 to about 5 mils thick. In relatively flexible articles, the barrier layer thickness will be from about 0.1 to about 2 mils.

The skin layer may comprise a tough, high melting resin such as olefinic polymers or copolymers. Plastic materials of satisfactory structural strength for use in the skin layers are thermoplastic organic polymers including the polyolefins: polymers based on monovinylidene aromatic monomers, and the like. Exemplary plastic materials for use in the skin layer include polyethylene, polypropylene, polystyrene, and the like. Polypropylene is most preferred.

The total amount of skin layer present in the multilayer article may vary in thickness, depending upon the particle application in which the article is to be used. The total amount of skin layer in the multilayer structure is generally from about 10 percent to about 40 percent of the total thickness of the structure. In relatively rigid articles, the skin layer thickness generally will be from about 4 mils to about 13 mils. In relatively flexible articles, each skin layer thickness generally will be from about 0.2 mils to about 3 mils.

Additional layers of plastic material may also be coextruded along with the above mentioned skin layers to effect a variation in the desired characteristics in the film, provided that the additional plastic material is compatible with the polymer of the skin layer. In accordance with coextrusion techniques, the respective polymer compositions are fed into separate polymer feeding devices of a coextrusion apparatus.

Processes for forming and using multi-layer structures such as those described above inherently produce a certain amount of scrap material. From an economic standpoint, it is desirable to employ this scrap material in a useful manner. Generally, the scrap material may be incorporated between the skin layer and the tie layer. The scrap, obviously, will comprise a majority of the polymer employed in the skin layer of the multi-layer structure, as well as a minor portion of the thermally sensitive polymer employed in the barrier layer and the polymer which forms the tie layers. The portion of polymer from the skin layer will form a continuous phase with the outer layer and generally does not require the use of an additional tie layer. The scrap material is generally between from about 5 to about 20 weight percent, based on the total weight of the skin layer.

The total amount of tie layer present in the multilayer article may vary in thickness, depending upon the particle application in which the article is to be used. Each tie layer is generally from about 2 percent to about 20 percent of the total thickness of the structure. In relatively rigid articles, the skin layer thickness generally will be from about 0.1 mils to about 3 mils. In relatively flexible articles, each skin layer thickness generally will be from about 0.5 mils to about 3 mils.

An exemplary material to be used in the tie layer is ethylene vinyl acetate.

It has been found that films made in accordance with this invention have balanced oriented crystalline phases and, consequently, possess improved physical properties compared to that of conventional films of vinylidene chloride interpolymers. Specifically, vinylidene chloride interpolymer films of the present invention have crystalline unit cells with a b-axis highly oriented in the machine direction, i.e., in the direction of movement of the film.

By "improved" physical properties means that, among other properties, the film will have high elongation in the transverse direction, e.g., high elasticity when the average orientation of molecular chains in the b-axis of crystalline units is biased toward the machine direction.

Further, the oxygen permeability of films according to the present invention will have a Dow permeability index of no more than about 2 units. The Dow index is calculated as follows: units are in (cc.mil)/(100 in$^2$.day.atm), wherein cc is the cubic centimeters of oxygen, mil is the sample thickness, in$^2$ is the surface area of the sample, day represents a 24-hour time period, and atm is atmospheric pressure in atmospheres. Beneficially the oxygen permeability of films according to the present invention will be less than about 1.0 Dow unit.

FIG. 1 represents the apparatus used in practicing the invention. Molten resin comprising vinylidene chloride interpolymer is provided from supply means (not shown). Supply means may be a reactor which feeds the vinylidene chloride interpolymer directly into the quench film process or an extruder into which powdered or pelletized vinylidene chloride interpolymer has been fed. By "molten" is meant that the resin temperature is below the degradation temperature and above the temperature at which the extrudate tears during drawdown. Suitable additives may be mixed with the vinylidene chloride interpolymer in feed means 8 or at any convenient location along the manufacturing line.

The molten resin is extruded from feed means to an extruder 10 and through an annular die gap 12. There can also be used a die of the structure in which the width of the die gap can be mechanically increased or decreased locally. The die and extruder are of the type which will be fully appreciated by those versed in the art and need not be described in detail.

A length of tubular extrudate 13 continually emerges from the extruder die gap 12. The extrudate is then cooled by a quench operation using cooling means well known to those of ordinary skill in the art. Exemplary quench means include (1) quench baths, such as those taught in U.S. Pat. No. 4,220,620; (2) air rings, such as those taught in U.S. Pat. Nos. 4,115,407, 4,330,501, 4,373,273, 4,749,346, 4,750,874, and 4,743,245; and (3) cooling mandrels, such as the one taught in U.S. Pat. No. 4,093,412: the teachings of which are hereby incorporated by reference.

As stated above, the quenching operation, in one embodiment, comprises passing the extrudate sock through a quench bath 16, which is shown in FIG. 1. When using a quench bath, a mineral oil feed 15 fills the interior of the sock with an effective amount of mineral oil to lubricate the interior surfaces of the extrudate sock to prevent adhesion between the layers of the extrudate sock when it is collapsed in subsequent operations. The mineral oil and water inside the extrudate sock prevent collapse of the extrudate sock and allow more uniform cooling while the extrudate sock is in the quench bath. The amount of water fed into the extrudate sock should, preferably, only deform the extrudate sock 5 percent in the transverse direction. During the quenching operation the quench bath will generally have a temperature in the range of between about 5° C. and 20° C.

Nip rolls 14 and 14A collapse the extrudate sock, removing substantially all of the water from the sock and forming a flat, two-layer extrudate sheet 17. As the extrudate sheet is fed between the quench bath nip rolls 14 and 14A, the extrudate sheet is placed under tension along the machine direction and is drawn away from the source of extrusion. Generally, the velocity of the extrudate sheet is roughly between about 8 and 14 times the extrudate velocity at the extruder die gap.

After the quenching operation, the extrudate sheet is drawn over idler roll 18, and is passed into reheat bath 20 during which time it is reheated to a temperature sufficient to soften the extrudate sheet for easy and optimum processing. While in reheat bath 20. Generally, the reheat bath will have a temperature of between about 20° C. to about 40° C., and preferably from about 25° C. to about 35° C.

The quench bath and the reheat baths may be replaced with a single bath having a temperature in the range of 15° C. to about 30° C. However, separate reheat and quench baths adjust the temperature of the extrudate more quickly than a single bath.

The extrudate sheet is first passed through a set of entrance nip rolls 21 and 21A, which rotate sufficiently faster than nip rolls 14 and 14A to keep slight tension on and draw the extrudate sheet through the quench bath 16 and the reheat bath 20. After being reheated, the extrudate sheet is blown into a bubble 22 by the insertion of a gaseous medium. During production of the bubble, the extrudate sheet will be inflated with a positive pressure of a gaseous medium, for example, air or nitrogen. The extrudate sheet will expand along its length, i.e., an expansion zone, into a bubble of maximum stable diameter and expand biaxially due to the pressure of a gaseous inflating medium forming the bubble. An exemplary method for inflating the extrudate sheet is to selectively insert gas supply means 24 into and penetrating through one layer of the extrudate sheet. Gas supply means 24 for inserting the gaseous medium into the tubular extrudate may be in the form of an air nozzle or line. The nozzle may be turned inwardly so that air discharge is nearer the center of the bubble rather than adjacent the sheet wall.

After inserting the nozzle between the extrudate sheet layers at point A, air is selectively injected into the extrudate sheet in a volume sufficient to form a bubble. The air line is supplied with air at a substantially constant temperature from a suitable supply line and the rate of flow of air and air pressure through the line is regulated by an air valve. Once the bubble is blown, the air nozzle is selectively removed from the side of the bubble at about point B. A discussion of the parameters employed in inflating the extrudate sheet is set forth below.

The extrudate sheet may be cooled by conventional techniques, e.g., ambient air. The extrudate sheet starts at a temperature of about 30° C. and will cool to a selected temperature, for example to about room temperature. After expansion, the bubble will warm to a temperature of between about 35° C. and 40° C. due to strain induced crystallization (the heat of crystallization raises the sheet temperature) but the bubble will again cool to room temperature.

The degree of expansion of the extrudate sheet into a bubble, as measured by the ratio of the fully expanded bubble circumference to the circumference of the die annulus, is known as its blow-up ratio. Typical sheets of vinylidene chloride interpolymers have a blow-up ratio generally in the range of at least 4.5 times the die diameter (a blow-up ratio of 4.5/1).

Further inflation with air merely increases the length of the bubble without significantly increasing the blow-up ratio. The polymer itself controls the extent of biaxial expansion. Thus the maximum stable blow-up ratio is determined mainly by the crystallization behavior and viscoelastic properties of the resin.

The cooled bubble goes into deflator means such as V-shaped frame 28 at the apex of which is deflator rolls 30a and 30b. Passing the bubble through the V-shaped frame and the deflator rolls collapses the bubble into a flattened film 33.

Thereafter, the outer edges of the flattened film are trimmed by knives 32a and 32b, which are depicted in FIG. 2. The film is then fed to delivery rolls 34a, b, c, and d.

Finally, the film is wound in rolls on winders 38a and 38b from which it may be dispensed for subsequent use.

After being collapsed by deflator means, the film will have a tendency to "neck in", i.e, the blow-up ratio will generally decrease due to release of transverse and machine direction tension. The necking in process is important for achieving a desired final blow-up ratio, i.e., the blow-up ratio of the film after the film has been allowed to neck in, i.e., such as at winders 38a and 38b shown in the figure. The final blow-up ratio determines the physical properties of the film. The final blow-up ratio of the film may range from between about 2.5 and about 3.5, and most preferably between about 2.8 and about 3.2.

According to the present invention, control of the size of the bubble is regulated by controlling the amount of air injected into the bubble. The bubble should have an effective blow-up ratio such that the bubble after deflation has a desired final blow-up ratio, which is defined below The bubble BUR should preferably be between about 2.5 and about 4. Within the above parameters, bubbles with greater BUR's tend to provide smoother film.

To achieve a desired final blow-up ratio, in one embodiment, the bubble may be allowed to neck in naturally, or in a second embodiment, the film may be stretched. In the first embodiment, the amount of necking is proportional to the BUR of the bubble. Preferably, the bubble BUR should be between about 2.8 and 3.5.

In the second embodiment, the film is "stretched", e.g., pulled through draw rolls 36a and 36b which accentuate the necking in process of the deflated bubble. The specific tension applied to the film will be dependent upon the size of the bubble employed. Generally, the film is drawn through draw rolls 36a and 36b at a tension of between about 500 and about 5000, preferably between about 3000 psi and about 5000 psi. Within the above blow-up ratio parameters, the smaller the bubble, the less tension applied by draw rolls 36a and 36b will be required to achieve the desired amount of "necking in" of the deflated bubble. Preferably, the stretched film will preferably have a bubble BUR of between about 3 and 4.

It has been found that films made in accordance with this invention have unique tear strength properties in the machine direction and percent elongation properties in the transverse direction.

Specifically, films of the present invention have a machine direction tear strength, as measured by Elmendorf tear strength (ASTM D-1922-67), of at least 1.5 times, preferably at least 2 times, and most preferably at least 3 times the transverse direction Elmendorf tear strength. Generally, within the relative ratios set forth above, the films have a machine direction Elmendorf tear strength of between about 50 and about 300, preferably between about 50 and 200: and a transverse direction Elmendorf tear strength of between about 10 and about 50.

Specifically, films of the present invention have a transverse direction percent elongation, as measured by ASTM D-882, of at least 1.5 times, preferably at least 2 times, and most preferably at least 3 times the machine direction percent elongation. Generally, within the relative ratios set forth above, the films have a transverse direction percent elongation of between about 70 and 300, preferably between about 70 and 200; and a machine direction percent elongation of between about 30 and about 70.

The resultant film has crystalline unit cells with a b-axis highly oriented in the machine direction, i.e., in the direction of movement of the film.

Maintaining a blow-up ratio effective to maintain the orientation of the polymer chains in the machine direction achieves high machine direction Elmendorf tear strength. Although not intended to be bound by theory, it is believed that the relatively small BUR provides advantageous molecular orientation, which, in turn, is likely responsible for the preferred physical properties of the films of the present invention. More orientation can then be expected to build up before the entire film becomes too rigid. Higher molecular orientation in the machine direction increases tear resistance in the machine direction to give improved dispensability.

Specifically, by maintaining a relatively small BUR, the vinylidene chloride interpolymer is selected to have crystalline unit cells with a b-axis, i.e., polymer chain axis, highly oriented in the machine direction, i.e., in the direction of movement of the film.

A number of known techniques are suitable for analyzing the orientation of the molecular structure of the film. Exemplary techniques include infrared (IR) trichroism, X-ray diffraction, birefringence, and IR dichroism. IR trichroism is the preferred technique because of its completeness and reproducibility of results, and will be discussed in greater detail below.

IR trichroism suitably may be used to measure the average orientation of molecular chain axes in both the crystalline and amorphous phases of vinylidene chloride interpolymer films by absorption bands in the infrared spectrum. Identification of the absorption bands in the infrared spectrum is achieved by studying the spectra of the molten resin, the quenched resin in the fully amorphous state, the partially recrystallized resin, and the polarized spectra of oriented films. The spectra yield orientation parameters which describe the average orientation of the polymer chain axes in three orthogonal directions: the machine, the transverse, and the thickness directions.

In depicting the orthogonal directions, the orientation parameter of the polymer chain in the machine direction is depicted as the X direction: the orientation of polymer chains in the transverse direction in the film plane is depicted as the Y direction; and the orientation of polymer chains in the thickness direction is depicted as the Z direction.

Preferably, the film will have at least one of the following orientation parameters, as measured by IR trichroism. Chain axes in the amorphous phase, assigned the 433 cm$^{-1}$ band, and "b" chain axis in the crystalline phase, assigned the 453 cm$^{-1}$ band, are defined as follows: $A_X/A_O > (3-A_Z/A_O)/2$ and $A_Y/A_O < (3-A_Z/A_O)/2$, wherein $A_Z/A_O$ can be from 0 to 1. This parameter defines chain orientations along the machine direction of the film.

In the crystalline phase, "c" axis, assigned the 531 cm$^{-1}$ band, is defined as follows: $A_X/A_O < (3-A_Z/A_O)/2$ and $A_Y/A_O > (3-A_Z/A_O)/2$, wherein $A_Z/A_O$ can be from 0 to 1. This parameter defines a chain orientation along the transverse direction of the film.

In the crystalline phase, the "a" axis is defined such that it falls within the region enumerated by $A_X/A_O < 1$, $A_Y/A_O < 1$, and $A_Z/A_O > 1$. This parameter defines an "a" axis orientation along the thickness direction of the film.

Values are determined for $A_X$, $A_Y$ and $A_Z$ which are the absorbance values recorded with the radiation polarized parallel in the X, Y and Z directions, respectively. $A_X$ and $A_Y$ are readily measured with the film plane perpendicular to the beam direction, but for determining $A_Z$, the film must be tilted about the X axis at a known angle to the beam and the absorbance measured with radiation polarized in the Y direction. For the purposes of this invention, $A_Z$ is derived from the tilted film (55° incident angle) absorbance $A_T$ using the relation, $A_Z = 3.1341 A_T - 2.6738 A_Y$.

The parameter $A_O$, defined as $\frac{1}{3}(A_X + A_Y + A_Z)$, is the absorbance expected for the sample, assuming that the orientation of the chains is completely random. $A_O$ is dependent only on the sample thickness and on the phase structure, i.e., the crystalline amorphous phase content. $A_O$ values are also used to provide the orientation parameters $A_I/A_O$ where I is X, Y or Z.

Each $A_I/A_O$ value expresses the average orientation of the transition moment of the mode of interest in the direction of the axis I. Values range from 0 to 3, with 0 indicating a perfect orthogonality and 3 a perfect parallelism of all moments present in the sample with the axis I. A value of 1 indicates random, or no preferred orientation; $A_I$ equals $A_O$, and $A_O$ is by definition the unoriented sample absorbance. Generally, sufficient samples of film must be tested for $A_I/A_O$ ratios using IR trichroism to provide an accuracy of ±0.05. These values are more readily visualized when the orientation parameters are plotted on triangular graph paper, as is known in the art.

It has been found that films made in accordance with this invention have unbalanced molecular orientation where the chain axis in both the amorphous and crystalline phases are preferentially aligned in the machine direction. Films made with a blow-up ratio of about 4.5 or greater have an average molecular orientation in the transverse direction. The balance of physical properties of the films of this invention include good tear resistance in the machine direction or high elasticity, i.e., percent elongation, in the transverse direction. The balance of physical properties renders the film particularly advantageous for consumer wrap applications.

The following examples are intended as illustrations only and are not intended to limit, in any manner, the invention as set forth in the claims.

Examples and Comparative Examples

The resin used in the following examples are all prepared by suspension polymerization techniques well-known to those skilled in the art. The resin employed is a vinylidene chloride copolymer formed from a monomer mixture comprising about 88 percent vinylidene chloride and about 12 percent vinyl chloride, both percentages being based upon copolymer weight. The copolymer has a major melt point of about 165° C. and a weight average molecular weight of about 100,000.

Comparative Example 1

In the following example the data given with respect to the orientation and strength characteristics refers to 0.5-mil film samples. The vinylidene chloride resin is extruded through a 2.5-inch die. The melt temperature of the extrudate is about 165° C. The extrudate is then cooled in a quench bath of 15° C. and a reheat water bath having a temperature of about 30° C. An air hose, emitting room temperature air, is inserted in the tube to create a trapped air bubble. The air hose is then removed. As the tube travels, it expands around the trapped air to form a bubble having a blow-up ratio (Bubble Diameter/Die Diameter) of about 4.5.

The bubble is then passed through a V-shaped deflator rack, and flattened into a film between two deflator nip rolls at the apex of the V. After being passed through the deflator nip rolls the flat film necks in to a blow-up ratio of about 4.3.

The film is edge trimmed, the layers separated, and wound on two mill rolls.

The properties of the film produced are determined by the following methods.

Molecular Orientation: Using IR Trichroism, spectra are recorded using a Perkin-Elmer 983 grating instrument at 2 cm$^{-1}$ nominal resolution. A wire-grid polarizer mounted in a motorized mount (at the entrance slit of the monochromator) with precise, external control provides very efficient polarization counts.

Elmendorf Tear Strength: ASTM D-1922-67. Measures the force required to propagate a tear, using a pendulum impulse type test. Presumably, this test simulates the conditions of the films practical use. A 2.5" × 2.5" film specimen is subjected to a "pant leg" type tear.

Tensile Strength and Elongation: ASTM D-882. Film strips, 1" ×5" are clamped at a 4" gauge length and deformed at a jaw separation rate of 2.0 in./min. Tensile strength is the engineering stress developed at break. Elongation is measured by the jaw separation at break of the film sample.

Two Percent Secant Modulus: ASTM D-882. Film strips, 10" ×0.5" are clamped at a 4" gauge length and deformed at a jaw separation rate of about 1 in./min. A force elongation trace is determined. Secant modulus is the slope of a line drawn from the origin to the load at 1 percent deformation.

The physical properties of the samples of film are measured and summarized in Table 1.

Example 1

The procedures of Comparative Example 1 are repeated with the following exceptions. The resin is expanded into a film bubble having blow-up ratio (Bubble Diameter/Die Diameter) of about 3.25.

The physical properties of the samples of film are measured and summarized in Table 1.

Example 2

The procedures of Example 1 are repeated with the following exceptions. The resin is expanded into a film bubble having blow-up ratio (Bubble Diameter/Die Diameter) of about 3.9. After being collapsed by the deflator nip rolls, the film is pulled between a pair of tension nip rolls. The tension nip rolls are set to apply tension (post stretch), in the machine direction, to cause enough necking in to provide a final blow ratio of about 2.6.

The physical properties of the samples of film are measured and summarized in Table 1.

TABLE 1

| Runs | BUR[1] | | Amorphous Phase Chain Axis (433 cm$^{-1}$)[2] | | | | Crystalline Phase[3] "a" Axis (658 cm$^{-1}$)$^a$ | | | |
|---|---|---|---|---|---|---|---|---|---|---|
| | Deflator$^{(a)}$ | Winder$^{(b)}$ | (3-Az/Ao)/2$_a$ | Ax/Ao$^b$ | Ay/Ao$^c$ | Ax/Ao$^d$ | (3-Az/Ao)/2 | Ax/Ao | Ay/Ao | Az/Ao |
| Compar. Example 1* | 4.5 | 4.3 | 1.23 | 1.21 | 1.25 | 0.54 | 0.505 | .51 | .50 | 1.99 |
| Example 1 | 3.25 | 2.7 | 1.27 | 1.34 | 1.21 | 0.46 | 0.61 | .59 | .63 | 1.78 |
| Example 2 | 3.9 | 2.6 | ** | ** | ** | ** | ** | ** | ** | ** |

| | | Crystalline Phase[3] | | | | | | | |
|---|---|---|---|---|---|---|---|---|---|
| | | "b" Axis (453 cm$^{-1}$)$^b$ | | | | "c" Axis (531 cm$^{-1}$)$^c$ | | | |
| Runs | | (3-Az/Ao)/2 | Ax/Ao | Ay/Ao | Az/Ao | (3-Az/Ao)/2 | Ax/Ao | Ay/Ao | Az/Ao |
| Compar. Example 1* | | 1.24 | 1.16 | 1.33 | .51 | 1.22 | 1.29 | 1.15 | .55 |
| Example 1 | | 1.29 | 1.37 | 1.21 | .42 | 1.11 | 1.04 | 1.19 | .77 |
| Example 2 | | ** | ** | ** | ** | ** | ** | ** | ** |

*Not an example of the present invention.
**Not measured.
[1] BUR is the blow-up ratio of the Bubble Diameter/Die Diameter of the film extrudate (a) prior to collapsing the bubble and (b) after collapsing the bubble.
[2] Amorphous Phase Chain Axis = relative orientation of the amorphous phase chain axis in the Ax, Ay, and Az directions.
[3] Crystalline Phase = relative orientation of the crystalline phase "a" Axis (658 cm$^{-1}$); (b) "b" Axis (453 cm$^{-1}$); and (c) "c" Axis (531 cm$^{-1}$) in the Ax, Ay, and Az directions.

| | Elemdorf Tear Strength[2] (gms/mil) | | 2% Secant Modulus[3] (psi) | | Tensile Rupture Strength[4] (psi) | | Percent Elongation (@ 0.2 in/min)[5] | |
|---|---|---|---|---|---|---|---|---|
| Runs | MD | TD | MD | TD | MD | TD | MD | TD |
| Compar. Example 1* | 6.5 | 9.3 | 64,300 | 56,600 | 10,400 | 17,200 | 42 | 49 |
| Example 1 | 265 | 39 | 73,500 | 55,100 | 14,700 | 7,700 | 39 | 105 |
| Example 2 | 200 | 20 | 81,900 | 56,700 | 16,200 | 10,100 | 29 | 144 |

*Not an example of the present invention.
[2] Elmendorf tear strength, in gms/mil, along (a) the machine direction and (b) the transverse direction.
[3] Two percent secant modulus, in psi, along (a) the machine direction and (b) the transverse direction.
[4] Tensile Rupture Strength, in psi, along (a) the machine direction and (b) the transverse direction.
[5] Percent Elongation @ 0.2 inches per minute, along (a) the machine direction, and (b) the transverse direction.

As can be seen in the above table, films which have a relatively low blow-up ratio possess a good balance of physical properties. Moreover, films with moderate blow up ratios, but have undergone post-deflator stretching possess a good balance of physical properties.

Examples 3–4

Examples 1–2 are repeated with the following exception: the film is formed from a vinylidene chloride interpolymer formed from a monomer mixture comprising about 88 weight percent vinylidene chloride and about 12 weight percent methyl acrylate, based on total monomer mixture weight. The copolymer has a weight average molecular weight of 100,000 and a major melting point of 170° C. The films exhibited similarly good physical properties.

While certain representative embodiments, Examples and details have been shown for the purposes of illustrating the invention, it will be apparent to those skilled in the art that various changes in the applications can be made therein without departing from the spirit and scope of the invention. For example, the use of other olefins or blends, or the same resin with varying additives may be encompassed by the scope of the claims.

I claim:

1. A film comprising a vinylidene chloride interpolymer, wherein the vinylidene chloride interpolymer having polymerized herein vinylidene chloride in an amount of from about 75 to about 95 percent by weight of interpolymer and from about 25 to about 5 percent by weight of interpolymer of at least one monomer copolymerized therewith, is prepared by extruding said interpolymer through an extrusion die to form an extrudate; passing the extrudate through a cooling means; blowing a blown tubular bubble by expanding the cooled extrudate sheet around a trapped gaseous medium, said bubble having an effective blow-up ratio before deflation such that the bubble after deflation has a desired final blow-up ratio; and conveying the tubular bubble through a deflator means to collapse the bubble into a two-layer film, wherein the film has a final blow-up ratio of between about 2.5 to about 3.5 said film having an amorphous phase and a crystalline phase with vinylidene chloride crystalline units, said crystalline units and amorphous units being positioned such that the film has a machine direction Elmendorf tear strength of at least 1.5 times the transverse direction percent elongation of at least 1.5 times machine direction percent elongation.

2. The film of claim 1 having a chain axis in the amorphous phase, as measured by IR trichroism, of $A_X/A_O > (3-A_Z/A_O)/2$ and $A_Y/A_O < (3-A_Z/A_O)/2$, wherein $A_Z/A_O$ can be from 0 to 1.

3. The film of claim 1 having a b-axis chain orientation, as measured by IR trichroism, of $A_X/A_O > (3-A_Z/A_O)/2$ and $A_Y/A_O < (3-A_Z/A_O)/2$, wherein $A_Z/A_O$ can be from 0 to 1.

4. The film of claim 1 having a c-axis chain orientation, as measured by IR trichroism, of $A_X/A_O < (3-A_Z/A_O)/2$ and $A_Y/A_O > (3-A_Z/A_O)/2$, wherein $A_Z/A_O$ can be from 0 to 1.

5. The film of claim 1 having an a-axis chain orientation, as measured by IR triohroism, of $A_X/A_O$ and $A_Y/A_O < 1$, and $A_Z/A_O > 1$.

6. The film of claim 1 wherein the vinylidene chloride interpolymer comprises vinylidene chloride monomer in an amount of from about 50 to about 96 percent by weight of interpolymer and at least one monoethylenically unsaturated monomer copolymerizable therewith in an amount of from about 50 to about 4 percent by weight of interpolymer.

7. The film of claim 1 wherein the monomer or monomers copolymerizable with the vinylidene chloride are selected from the group consisting of vinyl chloride, alkyl acrylates, alkyl methacrylates, acrylic acid, methacrylic acid, itaconic acid, acrylonitrile, and methacrylonitrile.

8. An article made according to the process of claim 1.

9. An article made according to the process of claim 6.

10. An article made according to the process of claim 7.

* * * * *